Aug. 28, 1934.  A. F. RUTHVEN  1,971,659
SELF GRINDING VALVE
Filed Feb. 19, 1931
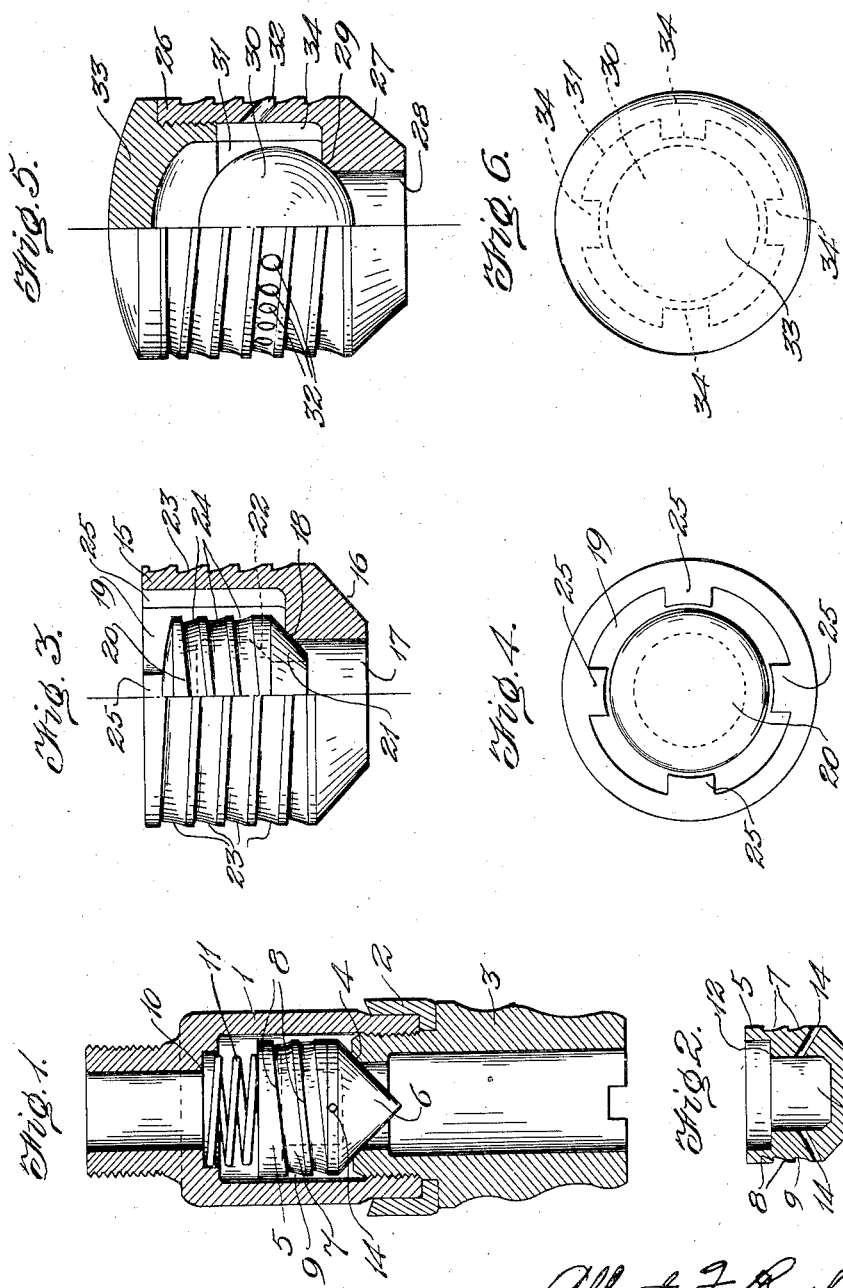

Patented Aug. 28, 1934

1,971,659

UNITED STATES PATENT OFFICE 1,971,659

SELF GRINDING VALVE

Albert F. Ruthven, Amarillo, Tex., assignor to Leatherless Plunger Pump Corporation, Amarillo, Tex., a corporation of Texas Application February 19, 1931, Serial No. 517,057

5 Claims. (Cl. 277—44)

This invention relates to an improvement in self-grinding valves.

The object of the invention is to provide an improved self-grinding valve whereby the valve member is turned when it is unseated by the flow of fluid thereby, so that the wear on the valve member and the seat will be distributed to keep a snug fit between the valve member and the seat.

It is desirable that there be relative movement between the valve seat and valve member when the latter is unseated, and this is accomplished in a novel and improved way in this invention.

In the accompanying drawing:

Fig. 1 is a sectional view through a valve cage enclosing a valve and embodying the invention;

Fig. 2 is a sectional view through the valve member;

Fig. 3 is a quarter sectional view partly in side elevation, through a modified form of valve member of the double type of self-grinding valve;

Fig. 4 is a top plan view thereof;

Fig. 5 is a quarter sectional view through still another form of the invention; and Fig. 6 is a top plan view of the same.

The numeral 1 designates a valve cage having a cup leather 2 connected therewith and attached to the externally ribbed section 3 which has a valve seat 4 formed at the upper end thereof. These parts may be of standard form and construction, such for instance as is employed in a deep well reciprocating pump. The ribs on the member 3 make it possible to use the equipment on any make of cylinders or working barrels, as the ribs are designed to fit any taper used in the manufacture of lower caps for working barrels and cylinders.

This is merely for purposes of illustration and is not intended to limit the invention to such use.

Seated on the valve seat 4 is a valve body designated generally by the numeral 5 and having a tapering seat engaging portion 6, which is shown in Fig. 1 as conical, although it may be frustro-conical or in any other shape as found desirable.

The valve body 5 is provided with one or more spiral external grooves 7 formed therearound, which grooves have the upper walls 8 thereof formed approximately at right angles to the axis of the valve body to form deflecting surfaces, against which the fluid impinges when flowing upwardly around the valve body to give a turning movement thereto relative to the valve seat.

The lower walls 9 of the grooves 7 are beveled or inclined to facilitate the impinging action of the fluid against the walls or surfaces 8 in the upward flow of the fluid around the valve member. The action of the fluid on the spiral grooves, causing the valve body 5 to turn slightly when unseated by the inflowing fluid, keeps the valve and seat effectively ground to a perfect fit.

The valve cage 1 is provided with a recess 10 therein, to receive a spring 11, shown in Fig. 1, the other end of which may engage a shoulder 12 formed in the upper end of the valve body 5, as shown particularly in Fig. 2. Such a spring may be employed, if desired, for tending to keep the valve seated, although it is not essential to this invention.

The valve body 5 is provided with an internal recess 13 therein, open to the upper end of the valve body but not to the lower end thereof, and small radial openings or holes 14 extend outwardly from the recess 13 to the periphery of the valve body 5 to allow sand to pass out of this valve body.

The form of the invention shown in Figs. 3 and 4 is of the type of double self-grinding valves in which outer and inner valve bodies are employed. In this form the outside valve body is designated generally by the numeral 15 and is provided with a frustro-conical seat engaging portion 16 at the lower end thereof, and an opening 17 through said lower end, at the upper end of which opening 17 a valve seat 18 is formed. An enlarged recess 19 is formed within the outer valve body 15 to receive an inner valve body 20, which has a frustro-conical seat engaging portion 21 at the lower end thereof adapted to engage the seat 18.

The inner valve body 20 is provided with an internal recess 22 open at the bottom of the valve body 20 but closed at the top, which prevents sand from depositing therein and also lightens the weight of this valve body, which, at the same time, effects a saving in the cost thereof and produces a well balanced hollow valve which has not been practical and which is not usually provided in hollow ball valves.

The outer and inner valve bodies 15 and 20 respectively are provided with spiral grooves 23 and 24, which are spirally turned opposite to each other, as shown in Fig. 3. The outer valve body 15 has a plurality of ribs 25 formed in the walls of the recess 19 to guide the inner valve body 20.

In Figs. 5 and 6 are illustrated a combined self-grinding valve body and a ball valve enclosed therein. The valve body is designated by the numeral 26 and is provided with a seat engaging portion 27 at the lower end thereof. An opening 28 extends through the lower end of the valve body 26 and at the upper end of this opening 28 is formed a valve seat 29 adapted to be engaged by a ball valve 30 enclosed within the hollow recess 31 formed in the body portion 26. A plurality of radial openings or holes 32 are formed through the wall of the valve body 26, through which the fluid passing around the ball valve is discharged. The holes 32 are tapered upward to the inner surface of the outer valve body 26 to prevent sand from entering and locking the ball valve 30 when the pump is not running.

A cover 33 closes the top of the recess 31 in the outer valve 26 to prevent sand from settling onto the top of the ball valve 30 and locking the same. The ball valve 30 is guided in its movement by ribs 34 formed in the sides of the recess 31, as shown particularly in Fig. 6.

The valves of this character are self-grinding inasmuch as they are turned slightly during their unseating and seating movements by the action of the fluid on the spiral groves formed therein, and by turning the valve members, the wear between these valve members and the seats is distributed uniformly to maintain a tight fit and avoid uneven wear and leakage, such as is the result of constant reciprocation of the ordinary type of valve member or plug.

The improvement is extremely simple but effectively accomplishes these results.

I claim:

1. A valve body having one or more spiral grooves formed in the periphery thereof, and extending entirely around said body, a conical seat engaging portion beneath the grooves, said body having a recess therein, and one or more radially extending openings extending from the recess through the wall of the valve body to the circumference thereof and inclined downwardly.

2. A valve structure comprising at least two telescoping valve bodies adapted to be seated, both of said bodies having spiral grooves formed in the peripheries thereof with the convolutions of the spirals extending in different directions for automatically turning the bodies in opposite directions during seating or unseating thereof.

3. A valve structure comprising at least two valve bodies telescopically connected together, one of said bodies having a seat in position to be engaged by the other, and both of said bodies having spiral circumferential grooves arranged therein with the convolutions of the spirals extending in different directions, for automatically turning the valves in opposite directions during seating or unseating.

4. In a valve construction, a valve body having a conical portion adapted to engage a seat, and a cylindrical portion extending upwardly from said conical portion, and one or more spiral grooves formed in said cylindrical portion and each groove extending circumferentially thereof throughout more than a complete convolution to cause turning movement between the valve body and seat upon unseating thereof.

5. A valve body having a seat-engaging portion and having one or more spiral grooves formed in the periphery thereof above said seat-engaging portion, and each groove extending entirely around said body throughout more than a complete convolution, said body having a recess therein, and one or more radially extending openings extending from the recess through the wall of the valve body to the circumference thereof, and inclined downwardly.

ALBERT F. RUTHVEN.